United States Patent

Kunz et al.

[11] Patent Number: 5,259,416
[45] Date of Patent: Nov. 9, 1993

[54] LATCHING VALVE FOR A FLUID SYSTEM

[75] Inventors: Bernard L. Kunz, Collinsville, Ill.; Randy L. Bomkamp, St. Louis; Gary E. Horst, Manchester, both of Mo.

[73] Assignee: Emerson Electric Co., St. Louis, Mo.

[21] Appl. No.: 963,465

[22] Filed: Oct. 20, 1992

[51] Int. Cl.5 ............................. F16K 11/00
[52] U.S. Cl. ........................ 137/883; 251/65
[58] Field of Search ............ 251/65; 137/870, 883

[56] References Cited

U.S. PATENT DOCUMENTS

| | | | |
|---|---|---|---|
| 2,844,352 | 7/1958 | Dahl | 137/863 X |
| 3,379,214 | 4/1968 | Weinberg | 251/65 X |
| 3,448,960 | 6/1969 | Medley | 251/129 |
| 3,480,040 | 11/1969 | Erickson | 137/883 |
| 3,814,736 | 6/1974 | Reinicke | 251/65 |
| 4,056,255 | 11/1977 | Lace | 251/65 X |
| 4,295,111 | 10/1981 | Wang | 335/256 |
| 4,534,539 | 8/1985 | Dettman | 251/65 |
| 4,733,212 | 3/1988 | Goodwin | 335/253 |
| 4,980,933 | 1/1991 | Tsutsui et al. | 4/420.2 |
| 5,029,807 | 7/1991 | Fuchs | 251/65 |

FOREIGN PATENT DOCUMENTS 9117380  11/1991  World Int. Prop. O. ............ 251/65

Primary Examiner—John C. Fox
Attorney, Agent, or Firm—Polster, Lieder, Woodruff & Lucchesi

[57] ABSTRACT

A latching valve for a fluid system including a valve housing, ported body chamber, and valve lids to control fluid flow between the ports, the valve lids being actuated by a moveable springloaded armature which, in turn, is controlled by a solenoid coil and readily replaceable permanent magnet which acts independently of the solenoid coil during latching operations.

10 Claims, 1 Drawing Sheet

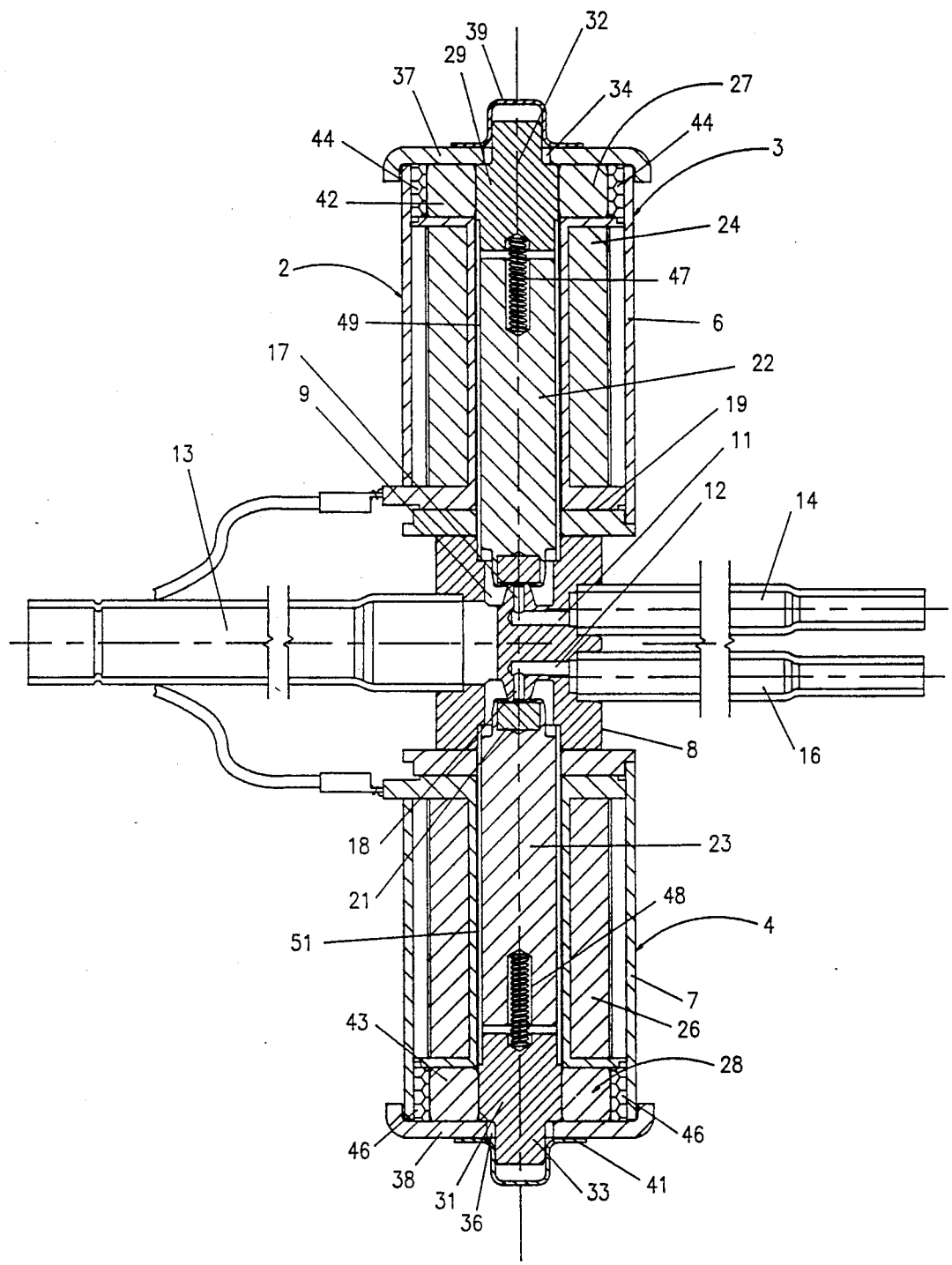

LATCHING VALVE FOR A FLUID SYSTEM

BACKGROUND OF THE INVENTION

The present invention relates to a unique latching valve structure and more particularly to a latching valve assembly for a fluid system which can be maintained in either a "first" or "second" direct flow position upon electrical energization and deenergization of valve control means.

Magnetic latching solenoid valves for controlling fluid flow in a fluid system have been long known in the valve art. Attention is directed to U.S. Pat. No. 3,448,960, issued to E. H. Medley on Jun. 10, 1969, which teaches such a concept by employing two permanent magnets, one of which is associated with a solenoid coil and the other being part of a moving armature, with latching depending upon attraction of two permanent magnets. In U.S. Pat. No. 3,814,376, issued to R. H. Reinicke on Jun. 4, 1974, a valve seat on an armature is latched in either one position or the other by applying current to a solenoid means in one direction or the other with the flux of a single permanent magnets thus being automatically switched to hold the armature in selected position. In U.S. Pat. No. 4,295,111, issued to W. S. Wang on Oct. 13, 1981, two solenoid coils are disclosed for latching a plunger or armature in one position or the other. In U.S. Pat. No. 4,534,539, issued to H. Dettmann on Aug. 13, 1985, two solenoid coils and four permanent magnet segments cooperate to latch and unlatch a latching valve by momentarily energizing one coil or the other. In U.S. Pat. No. 4,733,212, issued to A. V. Goodwin on Mar. 22, 1988, two solenoid coils and a magnetic material capable of being magnetized and demagnetized are disclosed. To activate a spring biased plunger into a latching position, the magnetic material is magnetized by momentarily energizing one solenoid coil and into an unlatching position by demagnetizing the magnetic material by energizing the other solenoid coil. Finally, in U.S. Pat. No. 4,980,933, issued to O. Tsutsui et al on Jan. 1, 1991, FIG. 6 thereof particularly discloses a pilot and main valve assembly with the pilot valve assembly having a solenoid coil and permanent magnet associated therewith for latching purposes of a diaphragm type valve seat member, the latching solenoid being energized electrically to receive either a positive or negative voltage charge to open or close such diaphragm valve seat member of the pilot valve assembly to influence direct fluid flow in the main valve assembly.

The present invention, recognizing that the use of a valve assembly which includes the use of a valve lid associated moveable armature actuated into latchable position through an energized solenoid coil means and a permanent magnet means is broadly old as is taught by the above noted references. The present invention further recognizes the undesirable limitations in power requirements and in organization of the past assemblies of the several abovedescribed references. Recognizing such power and structural limitations of the past art, the present invention provides a unique combination and construction of several known parts which allows for ready assembly and disassembly of the several parts in a manner which minimizes power requirements and which simultaneously optimizes the latching effect accomplished with a minimum of energy utilized, providing for ready assembly and disassembly of the several parts and allowing for ready hermetic sealing. In addition, the novel arrangement of the present invention allows for ready utilization of a three ported chamber to control and regulate fluid flow alternatively or simultaneously between several ports of the chamber in an economical and straightforward manner.

Various other features of the present invention will become obvious to one skilled in the art upon reading the disclosure set forth herein.

BRIEF SUMMARY OF THE INVENTION

More particularly the present invention provides a latching valve for a fluid system comprising: a valve housing means including a ported body chamber having at least two spaced ports, one of which serves as a main fluid flow inlet port and the other of which serves as a main fluid flow outlet port; valve seat means and moveable valve lid means cooperable therewith disposed in the ported body chamber adjacent at least one of the spaced ports and cooperative therewith to regulate main fluid flow directly between the spaced ports; control means disposed in the valve housing for the moveable valve lid means including solenoid means and a cooperative spring-loaded moveable armature means engaged with the moveable valve lid means to selectively control main fluid flow directly between the spaced ports upon selective energization and deenergization of the solenoid means; and, permanent magnet means removably disposed in the valve housing means, the permanent magnet means being physically and magnetically sized for ready assembly and disassembly into and from the valve housing means and being positioned with respect to the solenoid means and a preselected distance from an area of the spring loaded moveable armature means to optimally shorten the required independent magnetic latching effect force of the permanent magnet means when the solenoid means has been deenergized after the valve lid means has been moved to a "first" position by an energized solenoid means which has actuated the moveable armature means engaged with the valve lid means to the "first" position until reverse polarity is applied to the solenoid means to move the spring-loaded armature means and engaged lid means to a "second" position. In addition, the present invention provides a unique valve housing structural assembly which allows for hermetic sealing of the valve assembly therein and at the same time allows disassembly of a portion of the permanent magnet assembly for ready maintenance thereof. Further, the unique structure of the present invention allows for utilization of a three-ported chamber in combination with a pair of mirror-image inline valve housing assembly units to control fluid flow with respect to two of three ports.

It is to be understood that various changes can be made by one skilled in the art in one or more of the several parts of the structure disclosed herein without departing from the scope or spirit of the present invention.

BRIEF DESCRIPTION OF THE DRAWING

Referring to the drawing, an enlarged cross-sectional view of the novel latching valve assembly is disclosed in a unique embodiment incorporating two novel valve assemblies extending from a common intermediately positioned three ported body chamber in opposite, inline, mirror-image relationship.

DETAILED DESCRIPTION OF THE DRAWING

Referring to the drawing, the inventive valve assembly of the present invention is disclosed in a unique valve assembly arrangement 2 which includes a pair of vertically aligned, spaced opposed mirror-image valve assemblies 3 and 4, the unique valve arrangement 2 being particularly useful in fluid systems where fluid control for more than one zone is required, such as in any one of a number of known types of refrigeration systems presently in use in the refrigeration and air conditioning arts.

The pair of vertically aligned valve assemblies 3 and 4 include a pair of spaced vertical housings 6 and 7 respectively which longitudinally extend in opposite directions from a common, ported body chamber 8 which horizontally extends intermediately therebetween. In one possible embodiment of the present invention, housings 6 and 7 can be of cylindrical shape formed from a suitable material, such as C1018 cold drawn, seamless steel tubing. The horizontally extending, intermediate ported chamber 8, is designed to include three spaced ports 9, 11 and 12. Port 9 serves as a common fluid inlet port and the other two ports 11 and 12 serve as a pair of spaced outlet ports with inlet port 9 communicating with common fluid inlet conduit 13 and spaced outlet ports 11 and 12 communicating with separate outlet conduits 14 and 16 respectfully. Ported chamber 8 can be made from any one of a number of suitable corrosive resistant materials and advantageously can be formed from a hard plastic material. The pair of outlet ports 11 and 12 are each provided with a valve seat 17 and 18 respectively disposed in ported body chamber 8. These valve seats 17 and 18 serve to provide seats for valve lids 19 and 21 respectively which are each mounted in one of a pair of vertically extending cylindrical armatures 22 and 23 respectively. The valve lids can be made of a suitable plastic or rubber material and the armatures of a suitable metallic metal, such as stainless steel. Each of the pair of vertical armatures 22 and 23 are slidably disposed in one of the cylindrical housings 6 and 7, the valve lids 19 and 21 fixed to the armature ends adjacent ported chamber 8 serving to control fluid flow through outlet ports 11 and 12 respectively from a "first" position to a "second" position or advantageously, between "open" and "closed" position.

To actuate the slidably moveable armatures 22 and 23, a pair of annular solenoid coils 24 and 26 are provided, each respectively surrounding one of the pair of armatures 22 and 23, respectively. The solenoid coils advantageously are each comprised of a preselected magnet wire wound on a plastic bobbin and connected through lead terminals to an appropriate electric power source which, as above noted, is not disclosed herein but which can be an appropriate electrical power pack selected to energize, or deenergize coils 24 and 25 in a preselected order.

Disposed respectively within each valve housings 6 and 7 spacedly adjacent to the extremities of armatures 22 and 23 to be opposite those armature extremities carrying valve lids 19 and 21 respectively are a pair of permanent magnet assemblies 27 and 28. In accordance with one feature of the present invention, each permanent magnet assembly 27 and 28 is preselectively positioned in relation to solenoid coils 24 and 26 respectively to provide an optimum magnetizing force on the spaced outer extremities of armatures 22 and 23 during and after energization to move such armatures from a "first" or "open" position to a "second" or "closed" position. In this regard, it is to be understood that it would be possible to regulate the movement of the armatures to any one of several possible positions to control fluid flow in a preselected manner desired.

In accordance with still another feature of the present invention, each permanent magnet assembly 27 and 28 is made of several parts to permit for ready assembly, disassembly, and maintenance of each valve assembly 3 and 4. In this regard each of the permanent magnet assemblies 27 and 28 includes a magnetically conductive cylindrical first body portion 29 and 31 respectively. These body portions 29 and 31 are spaced from, aligned with, and geometrically conform with the vertically extending slidable armatures 27 and 28. Each body portion 29 and 31 is formed to provide an integral outside stem and shoulder arrangement 32, 33 to receive an aperture of the aperture pair 34, 36 of the pair of valve housing covers 37 and 38 for valve housings 6 and 7 respectively and one of a pair of snap closure covers 39 and 41. As will be noted in the drawing, each assembly of the pair of permanent magnet assemblies 27 and 28, further includes one of the pair of magnetically conductive annular second body portions 42 and 43 snugly surrounding the first body portions 29 and 31 respectively in moveable relation therewith to allow ready assembly therewith and insertion as a unit into the respective valve housings 6 and 7 with each second body portion 42 and 43 being approximately adjacent the extremity of the bobbin for solenoid coils 24 and 26 respectively. Advantageously, the first and second body portions of the permanent magnet assemblies 27 and 28 can be formed from a suitable solenoid grade stainless steel which has been mill annealed to provide the best magnetic properties. To complete the permanent magnet assemblies 27 and 28, a pair of flexible magnetic strips of material 44 and 46 each annularly surround one of the pair on annular body portions 42 and 43 respectively. These strips 44 and 46 advantageously are of commercially available magnet material selected to have strong resistance to demagnetization, to be readily shapable, to be flexible and resilient to shock and to be of a suitable thickness to snugly fit into an annular space provided between housings 6 and 7 and the outer peripheral surface of annular permanent magnet bodies 42 and 43.

A pair of appropriately sized, helically wound compression spring coils 47 and 48 of preselected size and compression strength properties are disposed in opposed, conforming recesses of the opposed cylindrical permanent magnet body portions 29 and 31 respectively and the opposed outer extremities of vertically extending moveable armatures 22 and 23 respectively. These springs 47 and 48 serve to urge the slidable armatures 22 and 23 respectively away from permanent magnet body portions 29 and 31 toward valve lid "close" position. In this regard, it is to be noted that the permanent magnet assemblies 27 and 28 above described—each including the snugly fitting body portions and the annular, flexible magnetic tape—are sized in strength and are positioned in their respective valve housings 6 and 7 with respect to the solenoid coils 24 and 26 and slidable armatures 22 and 23 so as to shorten and optimize the permanent magnetic latching effect when the valve lids 19 and 21 fixed to the lower end of the armature 22 and 23 respectively have been moved to "open" position by their respective armatures and the coils are subsequently deenergized until reverse polarity is selectively applied to the coils to move the slidable armatures to "closed" position.

In accordance with still another feature of the present invention, a pair of magnetically conductive, fluid impervious cylindrical enclosing sleeves 49 and 51, each extend vertically in valve housings 6 and 7 respectively between the respective housing solenoid coil and the armature to surround the slidable armature therein with one extremity thereof abuttingly sealed to ported body chamber 8 and the other end abuttingly sealed to the cylindrical body portion of the permanent magnet assembly so as to hermetically seal the ported body chamber 8 and the slidable armatures cooperating therewith. Advantageously, enclosing hermetic sealing sleeves 49 and 51 can be formed from a brightly annealed 304 stainless steel material of preselected magnetic permeability to accommodate the magnetic forces exerted by the respective solenoid coils and the respective permanent magnet assemblies.

From the aforedescribed it can be seen that a unique and novel latching valve arrangement is provided which is straight-forward and economical to manufacture, assemble and maintain, requiring a comparative minimum of energy and space to allow for ready control of direct fluid flow between one zone and two other spaced zones.

The invention claimed is:

1. A latching valve for a fluid system comprising: a valve housing means including a ported body chamber having at least two spaced ports, one of which serves as a main fluid flow inlet port and the other of which serves as a main fluid flow outlet port;
   valve seat means and moveable valve lid means disposed in said ported body chamber adjacent at least one of said spaced ports and cooperative therewith to regulate main fluid flow directly between said spaced ports;
   control means disposed in said valve housing for said moveable valve lid means including solenoid means and a cooperative spring-loaded moveable armature means having one of two opposite extremities thereof engaged with said moveable valve lid means to selectively control main fluid flow directly between said spaced ports upon selective energization and deenergization of said solenoid means;
   permanent magnet means removably disposed in said valve housing means, said permanent magnet means serving to provide a required magnetic latching force independent of said solenoid means and being physically and magnetically sized for ready assembly and disassembly into and from said valve housing means and being preselectively positioned with respect to said solenoid means and a preselected area of said spring-loaded moveable armature means to shorten and optimize such required independent magnetic latching force of said permanent magnetic means when said solenoid means has been deenergized after said valve lid means has been moved to a "first" position until reverse polarity is applied to said solenoid means to move said spring-loaded armature means and engaged lid means to a "second" position;
   said valve housing means comprising a longitudinally extending housing member with a longitudinally extending spring-loaded armature disposed therein to be slidably moveable relative said solenoid means disposed in said valve housing in coil surrounding relation to said longitudinally extending armature; said longitudinally extending housing having said ported body chamber positioned adjacent one extremity of said longitudinally extending spring-loaded armature means with said valve lid means connectably engaged to such armature extremity and said permanent magnet means positioned adjacent the opposite extremity of said longitudinally extending spring-loaded armature; and said permanent magnet including a magnetically conducting first body portion aligned with and geometrically conforming with said longitudinally extending spring-loaded armature and separate magnetically conducting second body portion surrounding said first body portion to allow ready assembly into said longitudinally extending valve housing member with said second body portion being spaced from the inner face of said valve housing member to permit insertion of said permanent magnet means geometrically configured to extend in surrounding relation with said second body member snugly intermediate said second body member and said valve housing member.

2. The latching valve for the fluid system of claim 1, said "first" position being an "open" position and said "second" position being "a closed" position.

3. The latching valve for the fluid system of claim 1, said permanent magnet means being positioned within said valve housing means adjacent said moveable armature means extremity opposite that extremity of said movable armature means engaging with said valve lid means.

4. The latching valve for the fluid system of claim 1, said ported body chamber being hermetically sealed within said valve housing means.

5. The latching valve for the fluid system of claim 1, said permanent magnet means including a flexible magnetic strip of material.

6. The latching valve for the fluid system of claim 1, said permanent magnet means including a flexible magnetic strip of material cooperatively mounted with respect to a magnetically conducting body portion.

7. The latching valve for the fluid system of claim 1, said valve housing means including a ported body chamber having three spaced ports, one of which serves as a cooperative fluid port with respect to the other two ports, with said valve seat means, said valve lid means, said solenoid means, and said spring-loaded moveable armature means comprising two valve assembly units formed as an operatively assembled pair in a valve housing to cooperate with two of said three ports with each of said assembled units forming said operatively assembled pair serving to move each of said two valve lids selectively into "first" and "second" positions, each with respect to its adjacent valve seat.

8. The latching valve for the fluid system of claim 7, each of said pair of valve assembly units being positioned in said valve housing in mirror-image relationship to extend from opposite sides of said ported body chamber.

9. The latching valve for the fluid system of claim 1, said fluid system being part of a refrigeration system.

10. A latching valve arrangement for a refrigeration system comprising: a pair of spaced vertical cylindrical housings longitudinally extending in opposite directions to include a common ported body chamber extending intermediately therebetween, said body chamber having three spaced ports, one of which serves as a common fluid inlet port and the other two of which serve as a pair of spaced fluid outlet ports;

- a pair of valve seats and a pair of yieldable valve lids disposed in said ported chamber cooperative with said pair of spaced fluid outlet ports to control fluid flow therethrough from said common fluid inlet port;
- a pair of vertically extending cylindrical armatures having opposite extremities, each armature being slidably disposed in one of said pair of cylindrical housings and having one of said yieldable valve lids fixed to one extremity thereof to cooperate selectively in "open" and "closed" relation with an adjacent valve seat;
- a pair of annular solenoid coils disposed in each of said pair of valve housings, each surrounding one of said vertically extending slidable armatures;
- a pair of permanent magnet assemblies disposed in each of said valve housings in cooperative relation with said solenoid coil and slidable armature disposed thereinto provide a required magnetic latching force independent of said solenoid coil, each magnet assembly including a magnetically conductive cylindrical first body portion having a valve housing cover receiving stem, said first body portion being spaced from, aligned with and geometrically conforming with an opposite extremity of one of said vertically extending slidable armatures, a magnetically conductive annular second body portion snugly surrounding said first body portion in moveable relation thereto to allow ready assembly into said valve housing, said second body portion being spaced from the inner face of said valve housing; and a flexible magnetic strip of material annular surrounding said second body portion within said space;
- a pair of helical spring coils, each positioned intermediate the opposite extremities of each of said slidable armatures to urge each of said slidable armature away from said permanent magnet assemblies toward valve lid "close" position with said permanent magnet means including said flexible magnetic strip of material being physically and magnetically sized in strength and positioned in said valve housing with respect to said solenoid coil and slidable armature to optimize the permanent magnetic latching effect when said valve lid fixed to the lower end of said slidable armature has been moved to "open" position by said solenoid coil until reverse polarity is applied to said solenoid coil to move said slidable armature along with the force of said spring to "closed" position; and,
- a pair of magnetically conductive, fluid impervious sleeves, each extending vertically in one of said valve housings between a solenoid coil and a slidable armature to surround said slidable armature with one of two sleeve extremities thereof abutting said ported body chamber and the other sleeve extremity abuttingly surrounding said first cylindrical body portion of said permanent magnet with the abutting sleeve extremities being in sealed relation at the abutments to hermetically seal said ported body chamber.

* * * * *